July 5, 1960 R. E. HALLENBECK, JR 2,944,130
THERMORESPONSIVE SWITCH MEANS
Filed July 30, 1957
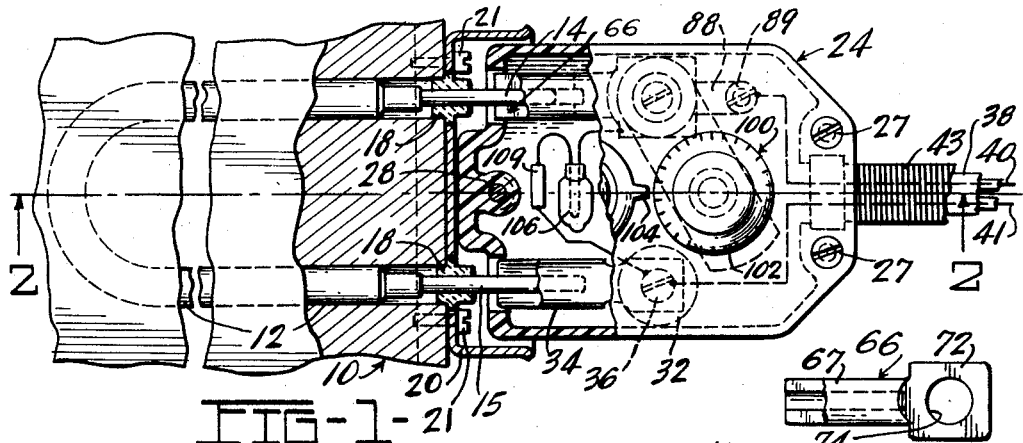
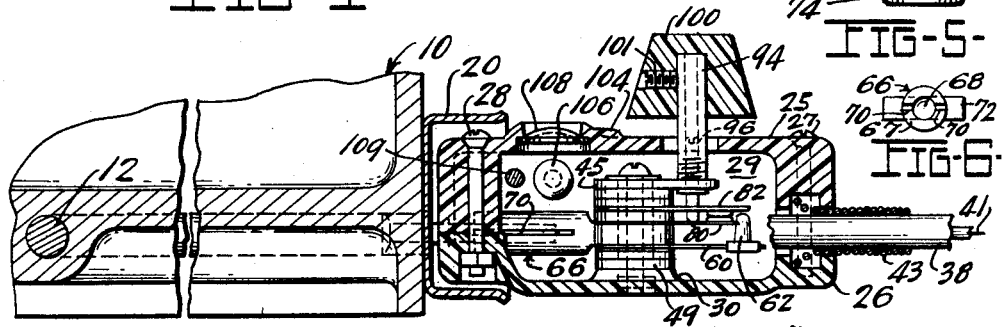
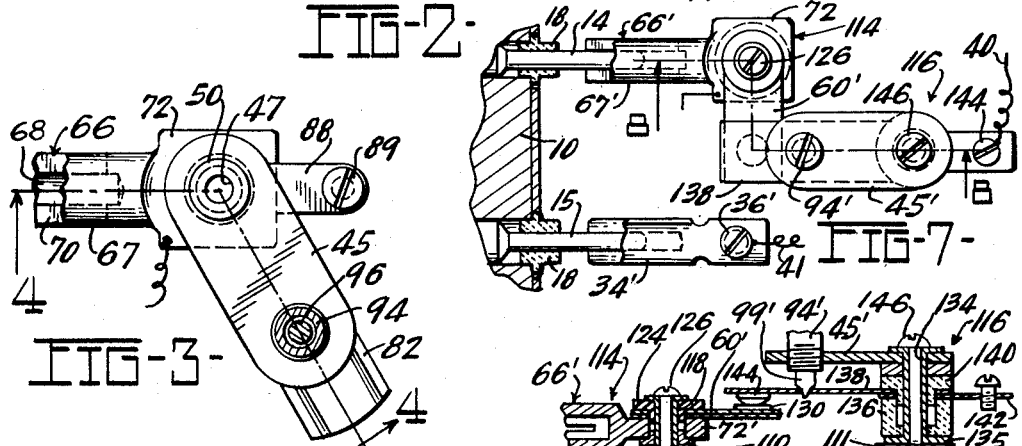
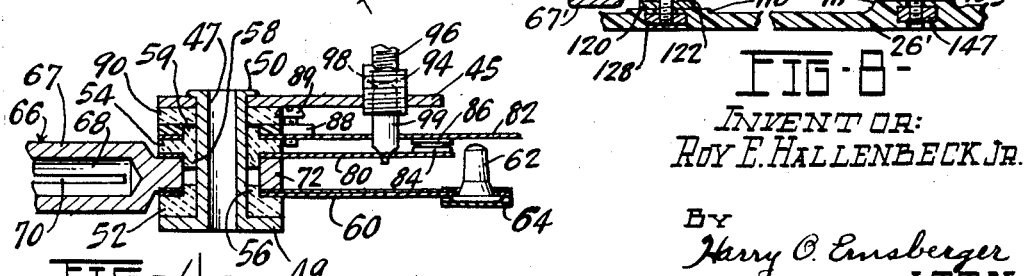
INVENTOR:
ROY E. HALLENBECK JR.
By Harry O. Emsberger
ATTY.

United States Patent Office 2,944,130
Patented July 5, 1960

2,944,130

THERMORESPONSIVE SWITCH MEANS

Roy E. Hallenbeck, Jr., Drayton Plains, Mich., assignor to Pace, Inc., Mansfield, Ohio, a corporation of Ohio Filed July 30, 1957, Ser. No. 675,079

4 Claims. (Cl. 200—136.5)

This invention relates to thermoresponsive switch mechanisms and more especially to a manually adjustable thermoresponsive switch mechanism embodying an element or bar arranged to effectively conduct or transfer heat to the thermoresponsive means for maintaining automatic control of a circuit of an electrically energizable heating means of an appliance or utensil.

In the manufacture of electrically heated cooking utensils as, for example, an electrically heated skillet or cooking receptacle, the handle portions of such appliances have heretofore been equipped with permanently installed, manually controllable, thermostat switch means for controlling or regulating the heating of the appliance within a desired temperature range. In thermostatically controlled cooking appliances of this character, a metal rod projects into the appliance in juxtaposed relation with the heating element of the appliance in order to transfer heat to the control means in the handle.

Thermostatic control means of this character integrated with the appliance is comparatively expensive, and is usable only with the appliance in which it is incorporated.

Removable thermostatically controlled switch mechanisms have been developed as independent units which may be disconnected from the appliance. Thermostatic control units of this character have been fashioned or manufactured with probe elements or bars projecting from the control unit into a well or bore formed in the base or body of the appliance in a region adjacent the heating unit for the purpose of conveying or transferring heat from the body or base of the cooking receptacle or appliance to the bimetallic element of the switch mechanism. Hence units of this character are usable only with appliances provided with a suitable well, recess or bore of a size to accommodate the projecting probe element associated with the control unit.

The present invention embraces the provision of a thermoresponsive switch mechanism or control unit of the probe bar type which is formed or fashioned as a complete integrated independent unit for adaptation and use with various electrically heated appliances such as skillets, roasters, cookers, grills, electric heating irons and the like which are equipped with a standard double prong male connector to receive the control unit of the invention and without being fashioned with a well or recess for a probe element.

An object of the invention is the provision of an independent control unit for an electrically heated cooking appliance or the like which is applicable for use with any appliance having a double prong connector means and which will effectively and automatically exercise accurate control of the temperature of the electrically heated appliance without requiring any modification of the appliance.

Another object of the invention is the provision of a thermoresponsive switch means for controlling an electrically heated appliance, the switch means embodying a probe element which functions as one of the female terminals or connecting devices embodied in the control unit and arranged so as to transfer heat from the electrically heated element in the appliance by direct conduction to a thermoresponsive means incorporated in the control unit whereby a precision automatic control of the temperature of the electrically heated appliance may be maintained.

Another object of the invention is the provision of an independent control unit for an electrically heated appliance embodying a female connector or terminal fashioned as a heat transferring element or probe bar which is heated from the electrically heated element in the appliance and heat generated by the resistance at the connection of the female terminal probe element with a male connection of the heating element in the appliance whereby the relative movement of a thermoresponsive means in the control mechanism is accelerated to provide for accurate temperature control of the appliance with a minimum change in temperature during repeated cycling movements of the thermoresponsive means.

Another object of the invention is the provision of a manually adjustable, thermoresponsive circuit control unit embodying a heat transferring probe element which serves as one of the connector components in circuit with the appliance wherein a minimum number of components are employed in the control unit which are compactly arranged and the assembly simplified whereby the cost of a unit of this character is greatly reduced.

The present invention embraces a form of control unit of this character wherein the thermoresponsive means or bimetal element may be employed as a current conductor fashioned and proportioned whereby passage of current through the bimetal element generates heat further enhancing the cycling of the bimetal element to control the current flow through the appliance and maintain the temperature deviations within a narrow range, the heat generated by current flow through the bimetallic element accelerating the initial movement or operation of the bimetal element from a so-called cold start so as to minimize the overshooting or high temperature rise which otherwise normally ensues when current flow is first established through the heating element of a cold appliance.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a plan view partly in section illustrating a portion of an electrically-heated appliance and a form of the combined thermoresponsive switch means and probe heat transfer element of the invention;

Figure 2 is a longitudinal sectional view through the control unit and portion of the appliance illustrated in Figure 1, the view being taken substantially on the line 2—2 of Figure 1;

Figure 3 is an enlarged top plan view of the assembly of switch components, thermoresponsive means and probe element integrated into a unit;

Figure 4 is a vertical sectional view through the arrangement shown in Figure 3, the section being taken upon the line 4—4 of Figure 3;

Figure 5 is a plan view of the combined terminal connector and heat transfer element of the invention;

Figure 6 is an end view of the element shown in Figure 5;

Figure 7 is a top plan view showing a modification of switch components, thermoresponisve means and combined terminal and heat transfer element of the invention, and Figure 8 is an expanded vertical sectional view taken substantially on the line 8—8 of Figure 7.

While the arrangement of the invention as disclosed in the drawings is especially usable for use in controlling the temperature of skillets, cooking appliances and utensils, it is to be understood that the control unit of the invention may be utilized for controlling the temperature of any appliance or article of manufacture embodying an electrically heated unit equipped with suitable current connecting terminals or prongs.

Referring to the drawings in detail, and first with respect to the arrangement shown in Figures 1 through 6, a portion of an appliance 10 is illustrated in Figures 1 and 2 which embodies an electrically-energizable heating element or heating unit 12. The appliance 10 may be a skillet, roaster, cooker, grill, electric heating iron or other electrically heated device with which an automatic thermoresponsive control is desirable or advantageous. As shown in Figure 1, terminals or prongs 14 and 15 are respectively connected with the end regions of the electrically-energizable heating unit 12.

The prongs 14 and 15 are supported or mounted in suitable insulating bushings or members 18 formed of lava, ceramic or other sutiable heat-resistant insulating material, the insulating members being dsiposed at the region of projection of the prongs from the appliance. A suitable guard or shroud 20 formed of sheet metal or other suitable material surrounds the region of the prongs 14 and 15 and is secured to the appliance by screws 21 or other suitable means.

The arrangement of the present invention embraces a circuit controlling unit which is readily connectable with and removable from an appliance so that it may be utilized with various appliances equipped with suitable or conventional current connecting prongs or terminals. In the present invention, the probe bar or heat transferring element for conveying heat from the electrically heated apliance unit 12 to the thermoresponsive means is incorporated in the portable control unit thereby eliminating the necessity of a well or recess in the appliance to accommodate a projecting probe bar or heat transfer element.

The switch mecahnism, heat transfer element and the thermoresponsive means is enclosed within a suitable housing 24 molded or formed of insulating material and preferably comprises an upper component 25 and a lower component 26 which are joined together by means of screws 27 and 28 in the manner shown in Figure 2. The components of the housing 24 together form a chamber 29 within which the appliance control mechanism of the invention is contained.

In the embodiment illustrated, the lower component 26 of the housing construction is formed with an upwardly extending boss portion 30 which supports a combined switch assembly, thermoresponsive means and a combined heat transfer element and terminal connector shown in Figure 2. The lower component 26 of the housing is formed with a second boss portion 32 which forms a support for a female connector clip or terminal member 34 formed of sheet metal of conventional construction adapted to be connected with the prong 15 of the heating unit 12. The connector clip 34 may be secured to the housing component 26 by means of a screw 36 or other suitable means as shown in Figure 1.

The rear regions of the housing components 25 and 26 are formed with semi-circular receses to accommodate the sheath 38 of rubber or other suitable insulation encasing or enclosing current supply conductors or wires 40 and 41 which are adapted to be connected with a current supply. The semi-circular recesses in the components 25 and 26 are shaped to accommodate the enlarged end region of a coiled spring-like member 43 which surrounds the sheath 38 at its region of entry into the housing 24 in order to protect the current conductors 40 and 41 against acute flexure.

The switch mechanism, the thermoresponsive means and the combined heat transferring bar and terminal connector are built up or assembled into a stack which provides a sturdy and compact assembly occupying a comparatively small space. The switch mechanism is inclusive of a frame construction comprising a frame plate 45 which supports a manual switch adjusting means hereinafter described, the plate 45 being formed with an opening into which extends an end region of a cylindrical sleeve or frame member 47.

The lower end region of the sleeve-like member 47 is formed with an outwardly extending circular flange 49, the upper portion of the sleeve, after assembly of the components supported thereby, being swaged or flanged over the upper surface of the frame plate 45 as shown at 50 in Figures 3 and 4. In this manner, the components of the switch, thermoresponsive means and heat transfer bar are held in fixed relation on the frame sleeve 47.

Surrounding the sleeve 47 and disposed adjacent the flange 49 is a circular member formed of insulating material 52. Also surrounding the sleeve 47 and spaced from the insulating member 52 is a second circular member 54 of insulating material. The members 52 and 54 are provided with tenon portions 56 and 58 respectively.

The assembly as shown in Figure 4 includes a thermoresponsive member or bimetallic element 60 formed of metals having different coefficients of expansion and provided with an opening to accommodate the tenon portion 56 of the insulating member 52.

The distal end of the bimetallic element 60 is equipped with a pin or strut 62 formed of lava, ceramic or other suitable insulating material, the pin being secured to the end region of the bimetallic element by means of a clip 64.

The arrangement of the invention includes a probe bar or heat transferring element 66 which also functions as a female terminal connector adapted for engagement with the prong or projection 14 of the electrically-energizable heating element 12. The probe bar 66 as shown is formed with a cylindrically shaped portion 67 formed with a bore 68 of a diameter preferably slightly less than the diameter of the terminal prong 14.

The wall of the cylindrical portion 67 is formed with a diametrically arranged slot or kerf 70 to provide the regions adjacent the kerf with sufficient resiliency or flexibility to frictionally yet slidably receive the prong 14 so as to establish good electrical connection therewith. The combined probe bar and terminal connector 66 is fashioned with a flattened head portion 72 which is preferably of a thickness less than the exterior diameter of the cylindrical tenon 67 in order to minimize the overall height of the switch assembly.

The head portion 72 is formed with a circular opening 74 of a diameter to snugly receive the circular tenon portions 56 and 58 of the insulating members 52 and 54 in the manner shown in Figure 4. The head portion 72 is in direct metallic contact or heat-transferring relation with the bimetal or thermoresponsive element 60 so as to effectively and efficiently transfer heat from the appliance to the bimetallic element. It should be noted that the tenon portion 67 of the probe bar is of substantial diameter or size in order to provide a substantial amount of metal to foster the conduction of heat to the thermoresponsive element.

The bar 66 is preferably formed of a material having efficient current conducting characteristics as well as a high heat conducting efficiency. It is thus preferably to form the probe bar and connector 66 of copper, brass, bronze, aluminum or other metallic material having the desirable electrical and heat conducting characteristics.

The assembly is inclusive of flexible switch arms, blades or members 80 and 82. The switch member 80 is equipped with a contact 84 and the switch member 82 is provided with a contact 86 which when in engagement are adapted to establish a circuit through the heating unit 12 in the appliance. As particularly shown in Figure 4, the switch element 80 is formed with an opening to receive the tenon portion 58 of the insulating member 54 and the switch member 82 is formed with an opening to receive the tenon portion 59 formed on the member 54.

Also mounted upon the tenon portion 59 of the insulating member 54 is a terminal member 88 equipped with a screw 89 adapted to be connected with the lead wire 40 or current conducting means with a current supply. The terminal member 88 is in direct metallic contact with the upper switch member 82. An insulating member 90 is disposed between the terminal member 88 and the frame plate 45 as shown in Figure 4.

From the foregoing it will be apparent that the bimetallic element 60, the combined terminal and probe bar 66 and the switch members or blades 80 and 82 are insulatingly supported upon the frame sleeve 47 and are held in assembled relation by the swaged portion 50 engaging the frame plate 45.

Means is provided for adjusting the position of one of the switch blades so as to modify the position of one of the contacts, the other switch blade and contact carried thereby being arranged whereby their position is determined by engagement of the strut 62 carried by the bimetallic element 60. In the embodiment illustrated in Figures 1 through 6, the position of the switch blade 80 is arranged to be controlled manually while the position of the switch blade 82 is controlled by flexure of the bimetallic element 60. The frame plate 45 is provided with a threaded opening adapted to receive a threaded shaft 94.

An interior bore in the shaft 94 is threaded to accommodate a second threaded member 96. The lower extremity of the interior shaft 96 is formed with a concave recess 98 which forms an abutment for the upper extremity of a strut or pin 99 formed of lava, ceramic or other suitable rigid insulating material. The lower end of the pin 99 is of wedge-shaped configuration and extends into a slot formed in the switch blade 80. The initial adjustment of the switch blade 80 may be made by regulating or adjusting the position of the threaded shaft or member 96 within the shaft 94.

The upper end region of the shaft 94 is adapted to receive and support a knob or manipulating member 100 secured to the shaft 94 by means of a securing screw 101 or other suitable means. The peripheral region of the knob 100 is formed with a plurality of graduations 102 calibrated to indicate temperatures. The graduations 102 are adapted for cooperation with an index 104 formed as an embossed portion on the upper component 25 of the housing 24.

By rotating the knob 100 and hence the shaft 94 through the medium of the threaded connection between the shaft 94 and the plate 45, the strut 99 engaging the switch blade 80 is moved vertically in order to flex the switch blade 80 to a desired position and hence to adjust the relative position of the contact 84. As the bimetallic element 60 becomes heated through the transfer of heat from the electrically heated element 12 through the prong 14 and bar 66 to the element 60, the latter is flexed upwardly, as viewed in Figure 4, engaging the strut 62 with the distal end of the blade 82. When the temperature reaches a predetermined value, the switch blade 82 is elevated to disengage the contacts 84 and 86 and interrupt the circuit through the heating element 12. The current supply wire or lead 41 is connected with the terminal screw 36 of connector 34 as shown in Figure 1. A suitable glow or pilot lamp 106 is disposed beneath a glazed sight opening 108 in the housing component 25, the glow lamp being in series with a resistance 109 and is intercalated in circuit with the switch mechanism whereby current flow through the switch mechanism and the appliance heating unit 12 energizes and illuminates the glow lamp 106 to indicate current flow.

Heretofore it has been conventional to utilize a probe bar as a heat transfer element which is projected into a well or recess formed in the appliance. In the present invention the probe bar 66 also forms one of the current connecting means or female connectors between the current supply and the electrically energizable heating element or unit 12.

When the heating unit 12 is energized, heat from the element is conducted through the prong 14 and the probe bar 66 direct to the bimetal element 60 which is in metallic contact with the head portion 72 of the connector 66. Thus the heat is efficiently and effectively transferred to the bimetal element so as to influence the latter to be flexed upwardly as viewed in Figure 4 in proportion to the increase in temperature of the appliance.

While the temperature of the appliance through its being heated by the unit 12 may be at a higher temperature than that of the prong 14 and the probe bar 66, it is to be understood that the transfer of heat from the appliance to the bimetallic element is substantially proportional so that it is possible to fashion the bimetal element 60 within a range of movement such that it will be responsive to proportionate temperature changes in the appliance.

Heat from the appliance conducted through the prong 14 and probe bar 66 is amply sufficient to cause the bimetal element 60 to be acutely responsive to the changes in temperature of the appliance and hence an effective automatic temperature control of the appliance is attained. The amount of heat conducted to the bimetal element 60 is augmented by the heat generated through the resistance of current flow from the terminal and probe bar 66 to the prong 14 so that the amount of heat conducted from the appliance by the probe bar to the bimetallic element is augmented by heat generated by reason of the resistance to current flow through the engaging surfaces of the probe bar 66 and the prong or terminal 14.

During operation of the control unit, the current initially supplied to the appliance heating unit 12 flows through the contacts 84 and 86 which are in engaging position, thence through the unit 12 and to the current supply wire 41 through the female connector 34. As the appliance becomes heated, heat is conducted through the prong 14, the cylindrical probe bar portion 67 of the connector 66 thence through the head portion 72 and to the bimetallic element 60. The bimetallic element 60 under the influence of the increasing temperature is flexed upwardly as viewed in Figure 4 causing the strut 62 to engage the distal end of the switch blade 82 flexing the latter upwardly. When the temperature of the appliance reaches a predetermined value as determined by the position of the switch blade 80, the upward movement of the switch blade 82 disengages the contacts 84 and 86 interrupting current flow through the appliance heating element 12. The manipulating knob 100 has been adjusted to the temperature at which it is desired to maintain the appliance, and the adjusting movement of the knob 100 determines the position of the switch blade 80 and the contact 84 so that thereafter the position of the bimetal element 60, under the influence of heat variations from the appliance, automatically maintains the appliance at a desired temperature or within a proper temperature range through the periodic completion and interruption of the circuit by reason of successive engagement and disengagement of the contacts 84 and 86 by flexure of the element 60.

The housing 24 enclosing the probe bar, switch mechanism and thermostat of the invention is preferably of a dimension to snugly fit within the flange of the sleeve 20 shown in Figures 1 and 2 so as to minimize the loss of heat from the prong 14 to the atmosphere and thereby secure a more efficient conduction of heat from the appliance unit 12 to the bimetallic element 60.

It will be apparent from the foregoing description of the arrangement illustrated in Figures 1 through 6, that the heat transfer bar, manually adjustable switch means and thermoresponsive means for automatically controlling the current flow to the appliance are constructed as a single unit which may be connected to any appliance having conventional prong construction. The unit is adaptable to any appliance as the projecting probe bar heretofore used has been eliminated and the appliance to be controlled need not be fashioned with a well or recess to accommodate a probe bar.

When the appliance is initially heated from a cold start, the first or initial application of electrical energy to the heating element 12 endures for a substantial time to bring the appliance up to the desired temperature. The first or initial application of electrical energy to the heating element 12 results in a comparatively slow transfer of heat by conduction to the bimetallic element 60 and the temperature of the appliance will overrun or overshoot the temperature setting on the dial 102.

As soon as the appliance temperature is lowered due to the interruption of the circuit through the contacts 84 and 86 and conduction or transfer of heat to the probe bar and bimetallic element decreases, the bimetal element cools and is flexed downwardly, permitting the blade 82 to move downwardly as viewed in Figure 4 closing the contacts 84 and 86 and reestablishing current flow to the appliance.

Reestablishment of the circuit again energizes the unit 12 and within a short period of time the heat conducted through the prong 14, probe bar 66 to the bimetal element 60 again flexes the latter to disengage the contacts 84 and 86. Thus the temperature of the appliance is held within a comparatively critical temperature range, and by reason of the direct transfer by conduction of heat from the appliance to the bimetal element 60, the recycling of the current flow and its interruption continues automatically to maintain the temperature of the appliance within a narrow range, the temperature range of the cycling being dependent in a measure upon the sensitiveness of the thermoresponsive means or bimetal element 60.

When a change of temperature desired for the appliance is to be had, the user simply rotates the dial or knob 100 to bring the graduation of the temperature desired in registration with the index 104. This movement modifies the initial position of the switch blade 80 and in this manner the range of automatic thermostatic control of the circuit through the appliance is obtained for any temperature selected by regulating the position of the dial 100.

Figures 7 and 8 illustrate a modified form of construction of the switch mechanism and thermoresponsive means wherein the bimetal element or thermoresponsive means is employed as a current-conducting member or medium. In this form of construction, the lower housing component 26' is formed with two boss portions 110 and 111. The boss portion 110 supports an assembly 114 of combined probe bar or heat transfer bar and connector and combined thermoresponsive and current conducting member, while the boss portion 111 supports an assembly 116 of switch blade or member and manually adjustable means for the switch blade or member. Figure 8 exemplifies an expanded sectional view for purposes of illustration.

The assembly 114 is inclusive of a sleeve 118 forming a frame, the lower end region of the sleeve being formed with a flange 120. Supported upon the flange is a combined probe bar and connector 66' formed with a cylindrically shaped portion 67' formed with a bore adapted to receive the prong 14 of the heating element 12. The combined probe bar and connector is formed with a flattened portion 72' which engages the flange 120 of the frame 118. Also assembled upon the frame sleeve 118 is a bimetallic element 60'. The portion 72' of the combined probe bar and terminal construction is insulated from the frame sleeve 118 by means of a circular insulating member 122. The bimetallic element 60' is insulatingly supported by the frame sleeve 118 through the medium of a circular insulating member 124.

The assembly of probe bar and bimetallic thermoresponsive means 114 is secured to the housing component 26' by means of a screw 126 which may be threaded into a nut 128 embedded or otherwise secured in the insulating material of the housing component 26'. The bimetal element 60' is provided with a contact 130.

The assembly 116 is inclusive of a frame sleeve 134 formed at its lower extremity with a flange 135. Disposed on the flange 135 is a circular sleeve or bushing 136 of insulating material. A switch blade 138 is provided with an opening to receive a tenon portion of an insulating collar 140 assembled on the frame sleeve 134. Disposed adjacent and in metal-to-metal contact with the switch blade 138 is a connector terminal 142 equipped with a terminal screw 144 adapted to be connected with the current supply wire 40. The distal extremity of the flexible switch blade 138 is provided with a contact 144 adapted for engagement with contact 130 on the bimetal element 60' for completing a circuit through the heating element of the appliance. A frame plate 45' is assembled on the frame sleeve 134 in the manner shown in Figure 8. The assembly 116 shown in Figure 8 is secured to the housing component 26' by means of a threaded member or screw 146, the threaded portion of the screw engaging a nut 147 which may be embedded in the insulating material of the housing component 26'.

The bimetal element 60' and the flexible blade 138 are in the relative positions indicated in Figure 7 for compactness of construction. A flexible female connector or terminal 34' is provided adapted to receive the prong 15 of the heating unit 12. The connector 34' is mounted in the housing in the same manner as illustrated in Figure 1 and is equipped with a terminal screw 36' adapted to be connected with the current supply conductor 41.

The manual adjusting means illustrated in Figures 1 and 2 may be employed in the arrangement shown in Figures 7 and 8. The shaft 94' illustrated in Figure 8 has a portion which is threaded into an opening in the frame plate 45', a ceramic or lava strut 99' being disposed between the shaft 94' and a slot in the switch blade 138. By adjusting the shaft 94' through the manipulation of a knob or member similar to the member 102 shown in Figure 1, the position of the switch blade 138 may be controlled.

The operation of the arrangement shown in Figure 7 is substantially the same as that shown in Figures 1 through 6. When electrical energy is initially supplied to the heating unit 12 of the appliance 10 the contacts 130 and 144 are in closed position as shown in Figure 8. The shaft 94' has been adjusted to the temperature at which it is desired to maintain the appliance.

As the appliance becomes heated, heat is transferred from the heating unit 12 through the prong 14 to the probe bar 67' through the head portion 72' to the bimetallic element 60'. As the heat causes flexure of the bimetallic element 60' in a direction away from the contact 144 the contacts become separated or disengaged and current flow through the appliance is interrupted.

As the appliance is cooled, the bimetallic element 60' cools and flexes in an upward direction to bring the contact 130 carried thereby into engagement with the contact 144 and current flow is again established through the heating element 12 of the appliance.

This recycling of current establishment and interruption conitnues under the influence of heat conducted to the bimetallic element 60'. The temperature at which it is desired to maintain the appliance may be controlled by manually regulating the position of the shaft 94' and hence the position of the switch blade 138 so that thereafter the thermoresponsive element 60' automatically establishes and disestablishes current flow through the appliance to maintain the appliance substantially at the desired temperature.

The arrangement shown in Figures 7 and 8 is contained in a housing substantially the same as the housing 24 shown in Figures 1 and 2 and the unit may be connected with the heating element of any appliance having conventional heating prongs or terminals of the character illustrated at 14 and 15. The present invention makes possible the combined manual and automatic thermostat control of most all electrically heated appliances without any modification or change in the appliances.

It is apparent that, within the scope of the invention, modifications and different arrangements may be made other than is herein disclosed, and the present disclosure is illustrative merely, the invention comprehending all variations thereof.

I claim:

1. Apparatus of the character disclosed, in combination, a housing formed of insulating material, a stacked switch mechanism disposed in said housing including a sleeve, a connector bar insulatingly carried by the sleeve and adapted to be directly connected with a terminal of an electrically energizable heating element, a thermoresponsive element insulatingly supported by said sleeve, said bar having a portion of cylindrical cross section terminating at one end in a flat portion, said cylindrical portion having an axial bore and a longitudinally extending diametrically arranged slot, the flat portion of said connector bar being arranged in direct contact with said thermoresponsive element for transferring heat by conduction from the heating element to the thermoresponsive element, a pair of switch blades insulatingly supported on said sleeve, a contact carried by each of said blades, manually operable means for regulating the relative position of one of said switch blades, said thermoresponsive element being arranged to control the position of the other of said switch blades responsive to heat transferred to the thermoresponsive element through the connector, a second connector formed of sheet metal adapted to be connected to the other terminal of the heating element, one of said switch contacts and said second connector being adapted to be connected with a current supply.

2. Apparatus of the character disclosed, in combination, a cylindrically shaped frame member, thermoresponsive means, a pair of flexible blades, said thermoresponsive means and flexible blades being insulatingly supported on said frame member, a contact carried by each of said blades, a current conducting connector member insulatingly supported on said frame member and in engagement with said thermoresponsive means, said connector member being formed with a portion of cylindrical cross section terminating in a flat portion, said portion of cylindrical cross section having an axial bore and a longitudinally extending diametrically arranged slot, the bore being adapted to receive a terminal of an electrically energizable heating element, the flat portion of said connector member being in direct contact with the thermoresponsive means, said connector member being adapted to conduct heat from the terminal of the heating element to the thermoresponsive means to influence the relative position of the thermoresponsive means, means associated with the thermoresponsive means adapted to engage one of said blades for influencing the position of said blade, and manually operable means for adjusting the relative position of the other of said blades.

3. A temperature control unit adapted to be removably connected with an electrically energizable heating element of an appliance, said unit including a housing formed of insulating material, switch mechanism in said housing including a pair of contacts adapted when in engagement to establish a circuit to the heating element, a bimetallic element arranged to control the position of one of said contacts, manually operable means for controlling the relative position of the other of said contacts, a combined terminal connector and heat transferring bar, said bar having a portion of cylindrical cross section terminating in a flat portion, said portion of cylindrical cross section having an axial bore of uniform diameter throughout its length providing a wall of substantial thickness and a longitudinally extending diametrically arranged slot, said bar being disposed with the flat portion thereof in direct contact with the bimetallic element whereby heat from the appliance is conducted by the terminal connector to the bimetallic element to influence the position of the element, a second terminal connector formed of sheet metal disposed in said housing, said second terminal connector and one of said contacts being adapted to be connected with a current supply.

4. Apparatus of the character disclosed, in combination, a housing formed of insulating material, switch mechanism disposed in said housing including a cylindrical frame member, a first connector formed of a block of metal insulatingly carried by the frame member and adapted to be directly connected with a terminal of an electrically energizable heating element, a thermoresponsive element insulatingly mounted by said frame member, said first connector having an elongated portion of substantial cross-section provided with an axial bore of uniform diameter throughout its length forming a comparatively thick wall for the elongated portion, said elongated portion having a longitudinally extending slot, said elongated portion terminating in a flat portion arranged in direct contact with the thermoresponsive element for transferring heat by conduction from the heating element to the thermoresponsive element, a pair of switch arms insulatingly mounted by the frame member, a contact carried by each of said arms, manually operable means for regulating the relative position of on of the switch arms, said thermoresponsive element being arranged to control the position of the other of the switch arms responsive to heat transferred to the thermoresponsive element through the first connector, and a second connector adapted to be connected to the other terminal of the heating element.

References Cited in the file of this patent

UNITED STATES PATENTS

| | | |
|---|---|---|
| 1,620,184 | Bersted | Mar. 8, 1927 |
| 1,780,631 | Peterson | Nov. 4, 1930 |
| 1,857,663 | Runsvold | May 10, 1932 |
| 1,857,906 | Wolcott et al. | May 10, 1932 |
| 1,857,923 | Lucia | May 10, 1932 |
| 2,024,471 | Norton | Dec. 17, 1935 |
| 2,317,033 | Dafforn | Apr. 20, 1943 |
| 2,407,764 | Oebbecke | Sept. 17, 1946 |
| 2,741,682 | Schwaneke et al. | Apr. 10, 1956 |
| 2,768,263 | Callihan | Oct. 23, 1956 |
| 2,774,846 | Lee | Dec. 18, 1956 |